United States Patent [19]

Nomoto

[11] Patent Number: 4,825,784

[45] Date of Patent: May 2, 1989

[54] CONTROL APPARATUS AND EMBROIDERY DATA FOR EMBROIDERING SYSTEM

[75] Inventor: Reishi Nomoto, Kanagawa, Japan

[73] Assignee: Janome Sewing Machine Co., Ltd., Tokyo, Japan

[21] Appl. No.: 139,846

[22] Filed: Dec. 29, 1987

[30] Foreign Application Priority Data

Jan. 9, 1987 [JP] Japan .................................. 62-1580

[51] Int. Cl.$^4$ ........................ D05C 5/04; D05C 9/04
[52] U.S. Cl. ................................ 112/103; 112/121.12
[58] Field of Search ............... 112/103, 102, 454, 456, 112/457, 458, 121.12, 453, 121.11

[56] References Cited

U.S. PATENT DOCUMENTS

| | | | |
|---|---|---|---|
| 4,502,402 | 3/1985 | Kato ................................ | 112/456 X |
| 4,522,138 | 6/1985 | Takenoya et al. ............... | 112/454 X |
| 4,664,047 | 5/1987 | Sano .................................. | 112/456 X |
| 4,742,786 | 5/1988 | Hashimoto et al. ............ | 112/454 X |

Primary Examiner—Peter Nerbun
Attorney, Agent, or Firm—Michael J. Striker

[57] ABSTRACT

An embroidery system is disclosed having an X-Y movable frame directed according to embroidery data that includes a flag designating a pattern, pattern data indicating the contour of individual pattern blocks, dimension data further defining the pattern and auxiliary dimension data.

3 Claims, 5 Drawing Sheets (2) Sewing machine
(3) Embroidery frame
(4) X- motor
(5) Y- motor

FIG_1
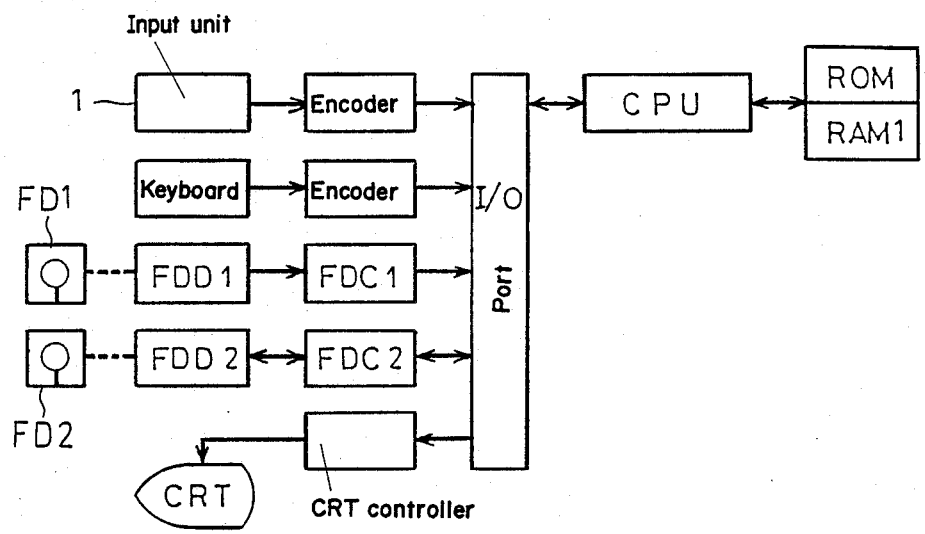
FIG_2
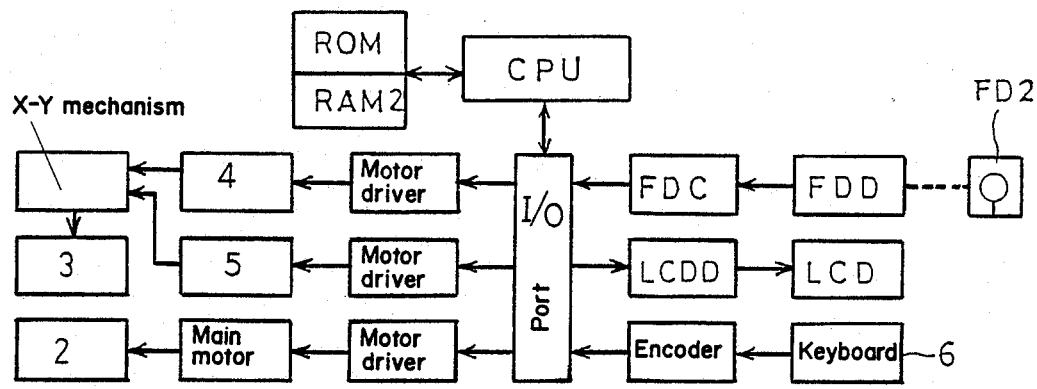
(2) Sewing machine
(3) Embroidery frame
(4) X-motor
(5) Y-motor

FIG_3
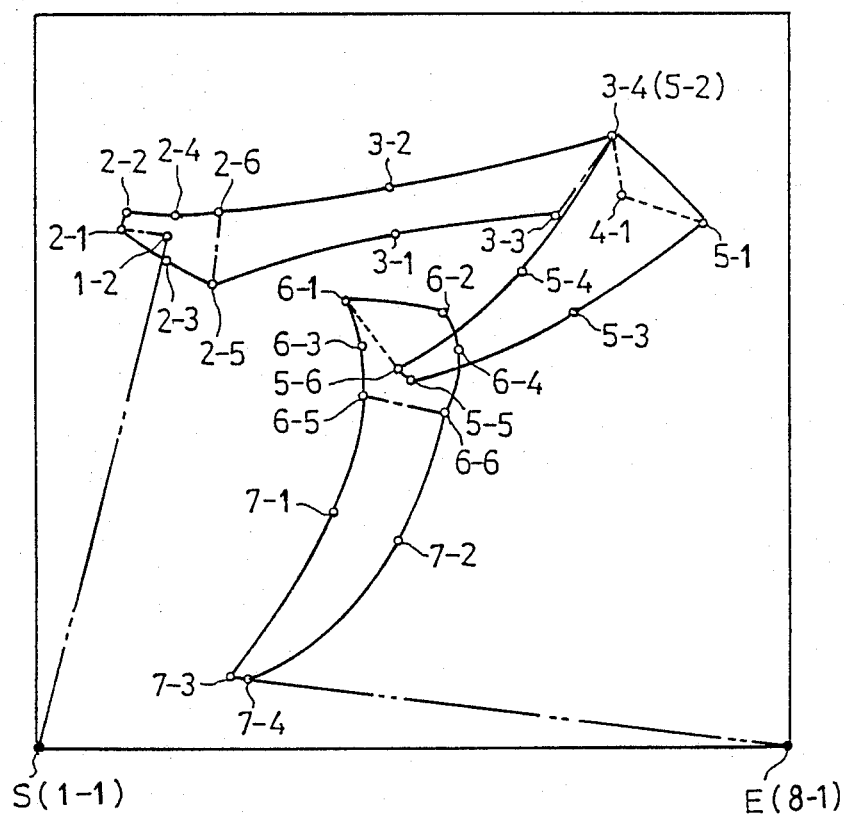

FIG_5
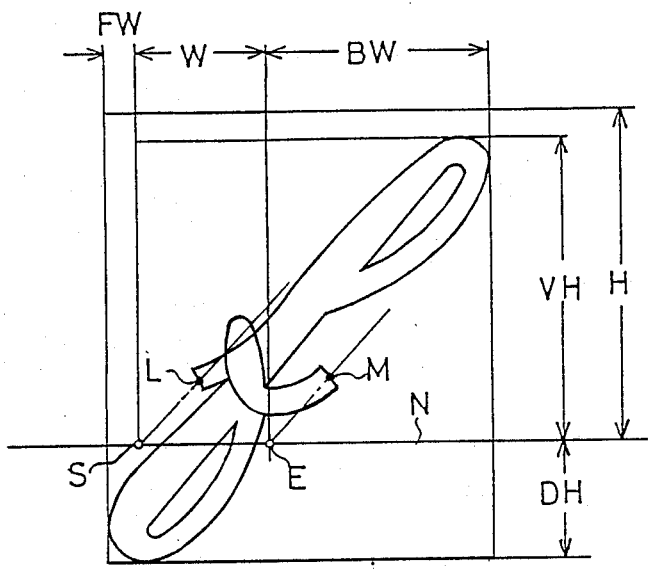
FIG_7
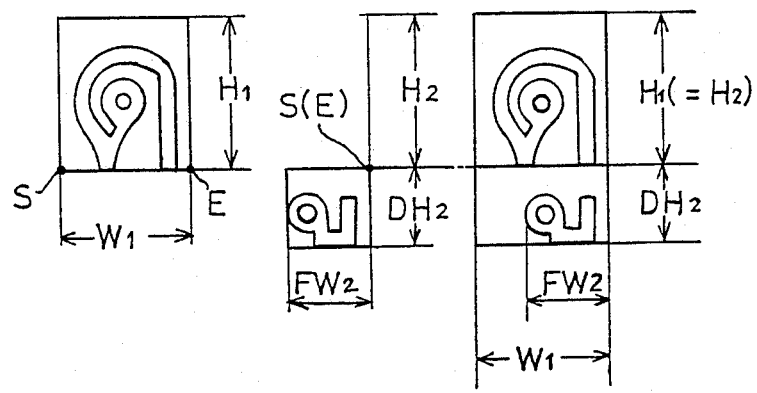

FIG_8
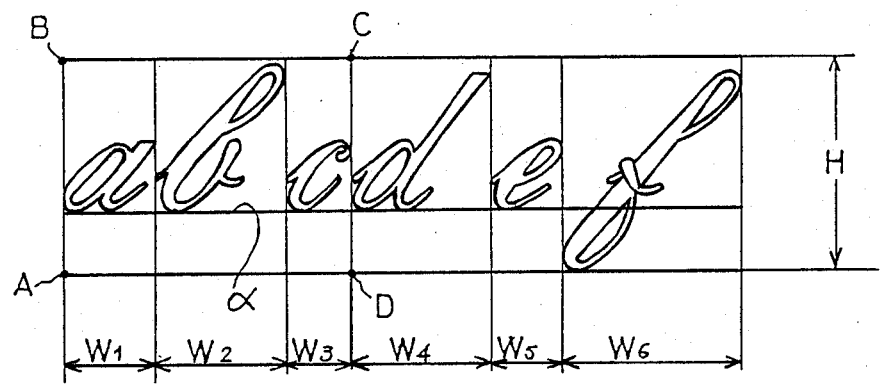
FIG_6
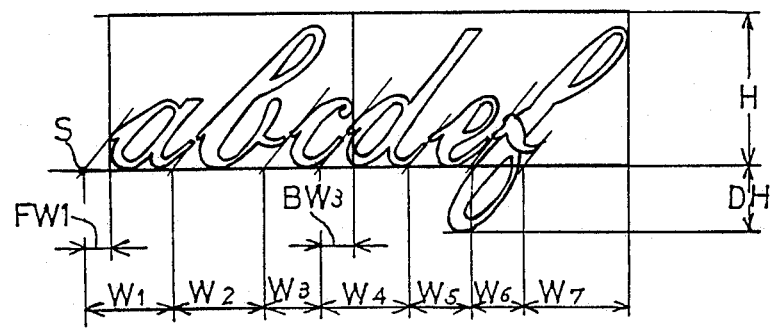

CONTROL APPARATUS AND EMBROIDERY DATA FOR EMBROIDERING SYSTEM

BACKGROUND OF THE INVENTION

The present invention relates to an embroidering system.

In an embroidering system having an embroidery data input device which generates embroidery data on the basis of an embroidery pattern and stores the data in an off-line storage medium, and an embroidering device which moves a stitch forming mechanism and an embroidery frame relative to each other on the basis of the embroidery data of the storage medium, to form stitches and execute embroidery; in a case where the pattern data of every needle dropping point is stored in the storage medium as has hitherto been practiced, the required quantity of data of letters, patterns etc. becomes enormous, and the required number of the storage media becomes very large.

Accordingly, a method has come into use in which, in the operation of storing data in the storage medium, only the principal coordinate values of a contour are stored instead of the above-stated pattern data of every needle dropping point, and needle dropping points are calculated immediately before an embroidering operation.

Even in this case, when the sorts and numbers of letters, patterns etc. increase, a more efficient storage of the storage medium is desired.

Secondly, embroidery patterns include large-sized patterns such as emblems and small-sized patterns such as letters. When the coordinate values of all the patterns are to be respectively stored by an identical system, a storage capacity capable of storing the large-sized pattern is required also for the small-sized pattern.

More specifically, each of Japanese letters, such as the letters of the alphabet, etc. suffices with a comparatively small storage capacity, and these letters form series based on styles and therefore increase with the number of patterns. Storing data in a storage medium with the capacity capable of storing the large-sized pattern, is wasteful worsens the storage efficiency and presents the problem of the increase of cost.

Thirdly, regarding prior-art embroidery data which has only the basic-frame dimension data of the width and height of a rectangle in relation to the size of a pattern, there are problems in that the letters of the alphabet, are difficult to combine into patterns in a joined state, at intervals, etc. preferable for the letters, and that the moving limits of a frame before an embroidery operation are difficult to be found precisely for actual embroidery parts.

In accordance with the present invention, in an embroidering system having an embroidery data input device which generates embroidery data on the basis of an embroidery pattern and stores the data in an off-line storage medium, and an embroidering device which moves a stitch forming mechanism and an embroidery frame relative to each other on the basis of the embroidery data of the storage medium, to form stitches and execute embroidery, an improvement comprising the following features; firstly, when the embroidery data is to be input, the pattern is divided into a plurality of blocks, the principal points of which have their coordinate values stored, and with note taken of the fact that function codes expressive of the same form often succeed when inputting the embroidery data, the codes indicative of the forms of all the blocks are not stored, but only when the forms of the blocks change, the function code corresponding to the new block is stored. Therefore, there is the function that the storage capacity of the memory of the input device can be saved. Further functions are that the storage capacity of the off-line storage medium which is prepared by writing the data of the memory thereinto can be saved, namely, that the number of the off-line storage media can be reduced, to attain an economical advantage, and that when the embroidering system is used, the selection of the off-line storage media by an operator is facilitated, to enhance a manipulation efficiency.

Secondly, the storage medium is provided with flag storing parts for discriminating whether coordinate values are of a 1-byte system or of a 2-byte system, and small-sized patterns such as letters are stored by the 1-byte system, while large-sized patterns are stored by the 2-byte system. Therefore, the invention has the advantage that, for the small-sized patterns which are stored by the 1-byte system, a storage capacity equal to about ½ of a capacity in the case of storing all embroidery data by means of the 2-byte system suffices.

Besides, in the embroidering device, whether the coordinate values are to be processed by the 1-byte system or the 2-byte system is decided according to the values of the flags in the load of the embroidery data. This produces the advantage that the storage capacity can be effectively utilized.

Thirdly, the embroidery data is endowed with auxiliary dimension data in addition to frame information on the widths and heights of patterns in a prior art, so that the combinations of patterns having hitherto been impossible are permitted, and that the moving limits of a frame before an embroidering operation are found precisely for actual embroidery parts. Therefore, the invention has the advantage that the range of application of embroidery can be expanded.

BRIEF DESCRIPTION OF THE DRAWINGS

FIGS. 1 thru 7 concern an embodiment of the present invention; in which FIG. 1 is a block diagram of an input device, FIG. 2 is a block diagram of an embroidering device, FIG. 3 is a diagram for explaining the inputting sequence of input pattern data, FIG. 4 is a flow chart showing the load of data from an external storage medium by the embroidering device, FIG. 5 is a diagram showing the basic-frame dimension data and auxiliary dimension data of an embroidery pattern, FIG. 6 is a diagram showing an example of the combination of letters to be embroidered, FIG. 7 is a diagram showing an example of the combination of the letter elements of Thai letters, and FIG. 8 concerns a diagram showing an example of the prior art combination of letters to be embroidered, in the case where embroidery patterns have only basic-frame dimension data.

Figure 4:
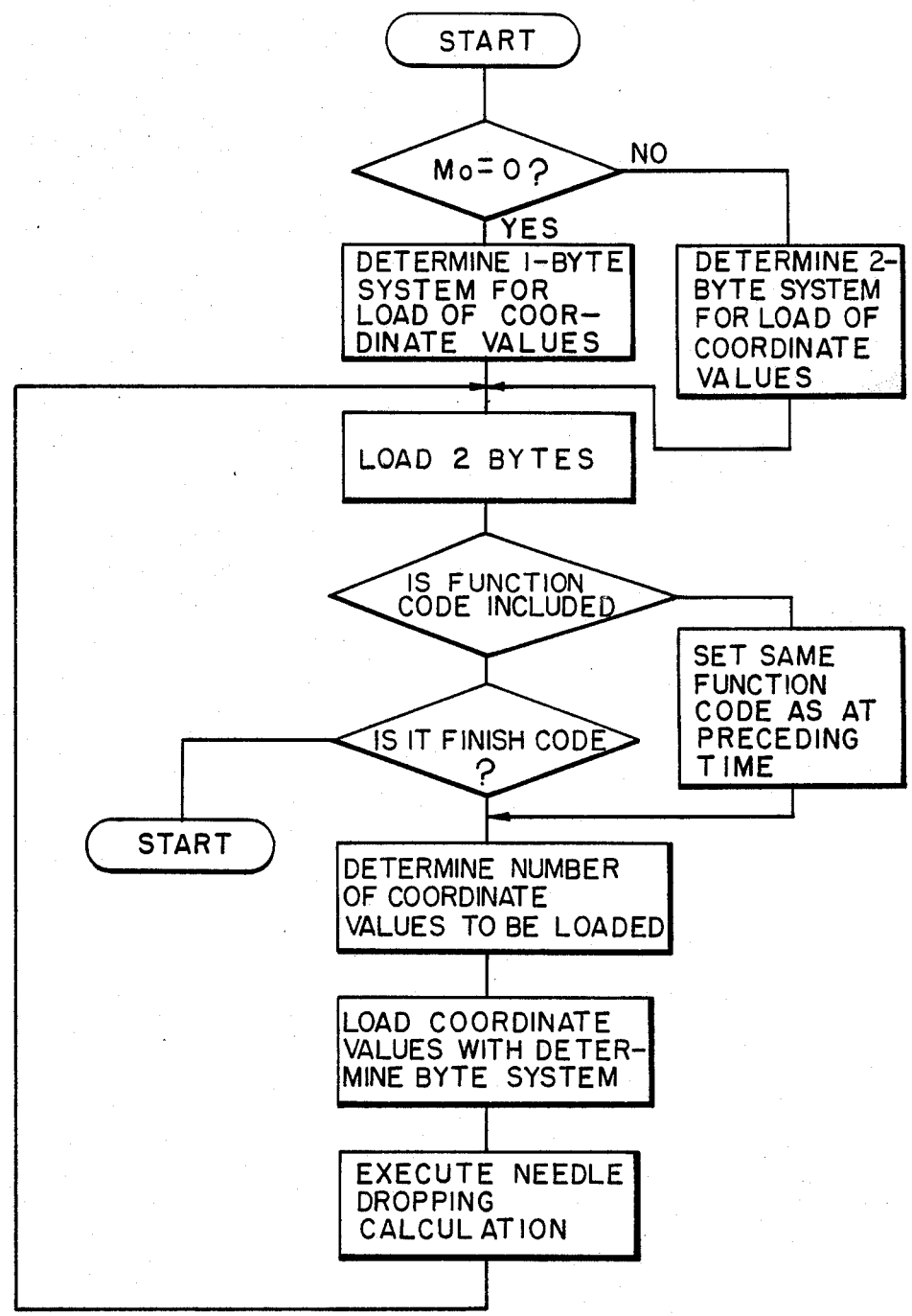

In the drawings, numeral 2 designates a stitch forming mechanism, numeral 3 an embroidery frame, symbol FD2 an off-line storage medium, symbol Mo a flag, letter S a stitching start point, and letter E a stitching end point. H dimension data and W dimension data constitute basic-frame dimension data, while FW dimension data, BW dimension data, VH dimension data and DH dimension data constitute auxiliary dimension data.

DESCRIPTION OF THE PREFERRED EMBODIMENT OF THE INVENTION

Now, the present invention will be described in conjunction with an embodiment. First, the schematic arrangement of a data input device in the embroidering system of the present invention will be described with reference to FIG. 1. Referring to the figure, an input unit 1 comprises a tablet and a cursor. The coordinate input panel of the tablet is partitioned into input parts for the coordinate values of embroidery patterns etc., and input parts for function codes. The function codes include, for example, stitching function codes in a mode for inputting the embroidery pattern from the tablet, and editing function codes in a correction mode. In each of the modes, respective functions are displayed on a display unit or cathode-ray tube (CRT) in correspondence with the function input parts of the tablet. In each mode, an operator points to the function input part of the tablet corresponding to the display of a desired function code on the display unit (CRT) by the use of the cursor, whereby the desired function code is selected. The system disk (FD1) of the data input device is inserted into a floppy disk drive (FDD1) in advance of a data generating operation, whereby a control program for the data input device, a program for generating embroidery data, a program for edition, etc. are loaded in the memory (RAM1) of a computer.

The display unit (CRT) monitors an input status at data inputting, and also monitors an operated status at data editing after the data inputting.

A data disk (FD2) is inserted into a floppy disk drive (FDD2) in a data writing mode, whereby the embroidery data generated by the data input device is written into this data disk, and the data written in this data disk is loaded and is displayed on the display unit (CRT) for the purpose of the edition.

Next, the schematic arrangement of an embroidering device in the embroidering system of the present invention will be described.

Referring to FIG. 2, the system comprises a sewing machine 2 for forming final-sewing stitches, and a mechanism including an X-motor 4 and a Y-motor 5 for moving an embroidery frame 3 on which fabric is set, relative to the needle position of the sewing machine.

Besides, the embroidery data for a letter, a one-point pattern, etc. to be embroidered is stored in the storing medium such as floppy disk FD2.

Using a keyboard 6, the operator selects the letter, the one-point pattern or the like to be embroidered. Then, the corresponding embroidery data in the floppy disk FD2 is loaded in the temporary storage (RAM2) of the embroidering device, and the needle dropping data of every stitch is calculated and stored. When necessary items such as an interval or an array are input with the keyboard 6 and an embroidery position on the fabric is determined with movement keys (not shown), control signals corresponding to X- and Y-coordinates are delivered to the X-motor 4 and Y-motor 5 every rotating operation of the sewing machine, and the embroidery frame 3 is driven, thereby to embroider the letter or the like selected.

Before inputting the embroidery data, "Input and Correction of Data" is set on a menu screen displayed on the display unit (CRT), to display the first screen serving as a main screen on the display unit (CRT), and "Digitizer Input" among the functions of the first screen is pointed to. Then, a setting alteration screen is displayed.

The standard specifications of the letter (pattern) are displayed on the setting alteration screen. When "Sort of Pattern" is set according to the sort of the pattern, choices for the sort of the pattern are displayed on the screen, and when one of the choices is selected, a flag Mo is set accoding to the sort of the pattern.

The flag Mo is intended to save a storage capacity. Regarding a pattern for which each of the coordinate values of embroidery data can be expressed within 254 units (for example, 25.4 mm assuming 1 unit=0.1 mm), X- and Y-coordinates are respectively stored by 1 byte, while regarding a pattern for which at least either of the coordinate values requires more than 256 units, X- and Y-coordinates are respectively stored by 2 bytes, and the flag Mo is afforded as information for identifying the patterns.

Mo=0 designates data of 1 byte, while Mo=1 designates data of 2 bytes, and the data items are identified at the process of load in the embroidering device.

Thus, small-sized patterns such as letters can be stored as 1-byte data. Therefore, the storage capacity suffices with about $\frac{1}{2}$ of that in the case of storing all patterns as 2-byte data and can be saved sharply.

As to an example of a Japanese letter shown in FIG. 3, the size of the letter is assumed to be within a frame each side of which is 15 mm. Then, since each of the coordinate values with the origin thereof set at a stitching start point S is expressed within 254 units, it is stored by data of 1 byte, and the flag Mo=0 is stored at the predetermined position of the memory (RAM1) of the data input device.

After the flag Mo has been set according to the sort of the pattern, "Alteration End" is set on the setting alteration screen. Then, the screen changes-over into the second screen, and various functions necessary for inputting are displayed thereon. Thus, it becomes possible to input the embroidery data.

The function code (hereinbelow, abbreviated to "code") which is input to the point of each of the various functions, is used as the shape of a segment connecting coordinate values subsequent to the point and as the control information of the sewing machine. By way of example, the codes are defined as follows:

Shape Codes for Blocks

FF20: Straight stitching
FF21: ZZ (zigzag) stitching whose contour is straight
FF30: Arc stitching
FF31: ZZ stitching whose contour is arcuate
FF50: Point stitching Control Information Codes FF01: Jump (at which only the embroidery frame moves)
FFFF: Finish Here, $FF^F$ at the first byte is an identifier code for the codes. If necessary, other codes can also be defined. For example, "FF40" is defined as a code which expresses free curve stitching.

Besides, in inputting a pattern, a suitable code is selected from among the aforementioned codes on the basis of the shape of the outline of the pattern, and the pattern is divided into blocks of a size expressible with the code, to determine the number of input points in accordance with the code. The number of input points is determined to be 2 for the straight stitching and to be 3 for the arc stitching by way of example.

As the input pattern, the Japanese letter shown in FIG. 3 will be exemplified.

The contour of the pattern of the Japanese letter is expressed by codes and coordinate values, which are input in a sequence to be stated below.

Hereunder, letters X and Y shall indicate the X-coordinate value and Y-coordinate value, respectively, and an expression "X, Y" shall indicate that the Y-coordinate value is input after the X-coordinate value has been input. Since the values X and Y are set at the flag Mo=0 as described before, they are respectively input into the 1-byte system.

| | |
|---|---|
| X, Y of Point 1-1, FF01 | Stitching start point S (Point 1-1) |
| X, Y of Point 1-2, FF20 | Jump to Point 1-2 |
| X, Y of Point 2-1, FF31 | Straight stitching to Point 2-1 |
| X, Y of Point 2-1<br>X, Y of Point 2-2<br>X, Y of Point 2-3<br>X, Y of Point 2-4<br>X, Y of Point 2-5<br>X, Y of Point 2-6 | ZZ stitching whose contour is arcuate |
| X, Y of Point 3-1<br>X, Y of Point 3-2<br>X, Y of Point 3-3<br>X, Y of Point 3-4<br>FF20 | ZZ stitching whose contour is arcuate |
| X, Y of Point 4-1 | Straight stitching to Point 4-1 |
| X, Y of Point 5-1<br>FF31 | Straight stitching to Point 5-1 |
| X, Y of Point 5-1<br>X, Y of Point 5-2<br>X, Y of Point 5-3<br>X, Y of Point 5-4<br>X, Y of Point 5-5<br>X, Y of Point 5-6<br>FF20 | ZZ stitching whose contour is arcuate |
| X, Y of Point 6-1<br>FF31 | Straight stitching to Point 6-1 |
| X, Y of Point 6-1<br>X, Y of Point 6-2<br>X, Y of Point 6-3<br>X, Y of Point 6-4<br>X, Y of Point 6-5<br>X, Y of Point 6-6 | ZZ stitching whose contour is arcuate |
| X, Y of Point 7-1<br>X, Y of Point 7-2<br>X, Y of Point 7-3<br>X, Y of Point 7-4<br>FF01 | ZZ stitching whose contour is arcuate |
| X, Y of Point 8-1<br>FFFF | Jump to Stitching end point (Point 8-1)<br>Finish code |

Here, the inputting of the function code is performed when the form of the block has changed, and it is omitted when the same block form continues. In addition, unless the straight stitching changes to the ZZ stitching, the preceding coordinate values are used for a point common to the rear end of the preceding block.

In the above example, the common points are the point 4-1 in the case of the continuation of the straight stitching and the points 2-5 and 2-6 and the points 6-5 and 6-6 in the cases of the continuation of the ZZ stitching whose contour is arcuate.

Frame data etc. concerning the pattern are stored in the memory (RAM1) of the input device, in addition to the flag Mo, function codes and coordinate values mentioned above. These data items are written into the data disk (FD2) being the off-line storing medium as the embroidery data by the input device.

By preparing the data disk (FD2) with the compressed embroidery data as stated above, the storage capacity of the memory (RAM2) of the embroidering device which utilizes the memory (RAM1) and data disk (FD2) of the input device may be small, and moreover, especially the storage capacity of the data disk (FD2) for storing the embroidery data may be small.

More specifically, in case of storing stitching data in the data disks (FD2), the number of letters which can be stored in the single disk increases, and the required number of the disks can be decreased in the presence of a large number of letters, for example, Japanese letters.

Thus, the number of times of selection of the disks which the operator uses in the embroidering operation can be decreased, so that the manipulation of the embroidering system is facilitated much more.

As regards Japanese letters, when a size 3.5' is used for the data disk (FD2), about 1000 letters can be stored in the single disk. In case of using the letters for family names, all of Japanese letters which constitute 5000 principal family names in Japan can be stored in the single disk, so that necessary data can be loaded without changing the disk.

Next, the needle dropping calculation means of the embroidering device for calculating needle dropping points from the compressed embroidery data of the data disk (FD2) will be described with reference to FIG. 4.

Referring to FIG. 4, the stored part of the flag Mo for a letter pattern or the like selected is loaded. In case of Mo=0, it is determined that coordinate values are to be loaded by the 1-byte system, and in case of Mo≠0, it is determined that they are to be loaded by the 2-byte system. Subsequently, pattern data consisting of a function code and the coordinate values is loaded by the 2 bytes. In a case where the pattern data includes the function code (except the finish code), the number of subsequent coordinate values to be loaded is determined, and the coordinate values are loaded by the 1-byte or 2-byte system determined according to the flag, whereupon a needle dropping calculation is executed. In a case where the 2 bytes of the pattern data do not include the function code, the same function code as at the preceding time is set, the number of coordinate values to be loaded is determined to the same number as at the preceding time, including the number of the coordinate values of a common point at the rear end of the preceding block, and the coordinate values are loaded, whereupon a needle dropping calculation is executed. Thenceforth, these steps are repeated until the finish code is loaded. Needle dropping data items obtained by the needle dropping calculations are successively stored in the memory (RAM2) of the embroidering device.

Embroidery is performed in such a way that the fabric to be embroidered is stretched on the embroidery frame, and that stitches are formed by moving the frame in the X- and Y-directions relative to the needle of the sewing machine. An embroidery position is selected at any desired position within the embroidery frame.

In this case, when the embroidery position is selected near the end of the inner area of the embroidery frame, the needle and the embroidery frame interfere during the embroidery, and the interference forms the cause of any accident or the collapse of the pattern. Therefore, the embroidery frame needs to be moved for the confirmation of stitching limits in advance of the embroidery.

In a prior-art example, embroidery letters which are received within fixed rectangular frames pose no serious problem. In case of the script letters of the alphabet as shown in FIG. 8 by way of example, however, when the heights H of the frames are equalized in conformity with the letter of the maximum height among the letters and the widths W of the frames are set at the widths ($W_1$, $W_2$, ... and $W_6$) of the individual letters, the letters a, b and c which are configured of only parts above a reference line α present a frame ABCD after the combination thereof, with the result that actual stitched parts cannot be expressed. Simultaneously, the intervals of the joint parts between the letters are liable to become unnatural.

The calculation of the precise limits of the frame after the combination as based on the appropriate intervals of the joint parts of the letters is permitted by extracting necessary data from all stitching data. This measure, however, is not practical for the reason that a considerable processing time is required due to a large amount of stitching data.

The embroidery data of the present invention includes data for stitching, and is also endowed with basic-frame dimension data and auxiliary dimension data concerning the size of a pattern. Thus, the favorable combination of letters or the like having hitherto been difficult can be readily realized, and the moving limits of the frame before embroidery can be precisely found with respect to actual embroidering limits.

These will be elucidated in connection with an example in FIG. 5.

First, a stitching start point (S) and a stitching end point (E) are evaluated. They are adequately found depending upon the sort of a letter. In the example of the script letter f of the alphabet illustrated in the figure, parallel lines are drawn which pass through the handwriting initiation point (L) and handwriting termination point (M) of the letter respectively and which define angles of about 40° to a reference line (N) in conformity with the inclination of the letter, and the intersection points of the respective lines with the reference line (N) are set as the stitching start point (S) and stitching end point (E). Subsequently, the basic-frame dimension data and auxiliary dimension data indicated below are decided.

H dimension data: Y-directional dimension set above the reference line in correspondence with the sort of the letter or the like.

W dimension data: X-directional dimension from the stitching start point to the stitching end point proper to the individual letter and set on the reference line.

FW dimension data: X-directional dimension of a part protruding leftwards from the stitching start point.

BW dimension data: X-directional dimension of a part protruding rightwards from the stitching end point.

VH dimension data: Y-directional dimension of a part protruding upwards from the stitching start point.

DH dimension data: Y-directional dimension of a part protruding downwards from the stitching start point.

Among the aforementioned data items, the H dimension data and the W dimension data are the basic-frame dimension data items, and the FW dimension data et seq. are the auxiliary dimension data items.

According to the frame setting method of the present invention, in embroidering letters a, b and c by way of example as illustrated in FIG. 6, a frame after the combination of the letters can be set at a height of H and a width of $FW_1 + W_1 + W_2 + W_3 + BW_3$, and correct stitching limits can be displayed. The dimension data $FW_1$ in this case lies inside the stitching start point, and therefore becomes a minus value.

Besides, regarding a composite letter such as Thai letter composed of the elements of letters, it has been impossible to form the letter in the combination of the elements merely with the basic-frame dimension data in the prior art. According to the present invention, it becomes possible to form such letters, and data can be reduced much more than in case of preparing combination letters beforehand as in the prior art.

When, as in a Thai letter " " shown in FIG. 7, a letter element joins below a preceding letter element, the stitching start point (S) and stitching end point (E) of the former are set at an identical point. Then, W=0 holds, and the letter element is regarded as one having only $FW_2$ in the X-direction. A frame after the combination has a width of $W_1 + W_2(=0) = W_1$, and the letter elements can be combined.

As described above, according to the present invention, in an embroidering system having an embroidery data input device which generates embroidery data on the basis of an embroidery pattern and stores the data in an off-line storage medium, and an embroidering device which moves a stitch forming mechanism and an embroidery frame relatively on the basis of the embroidery data of the storage medium, to form stitches and execute embroidery, first of all, when the embroidery data is to be input, the pattern is divided into a plurality of blocks, the principal points of which have their coordinate values stored, and with note taken of the fact that function codes expressive of the same form often succeed when inputting the embroidery data, the codes indicative of the forms of all the blocks are not stored, but only when the forms of the blocks change, the function code corresponding to the new block is stored. Therefore, there is the effect that the storage capacity of the memory of the input device can be saved. Further effects are that the storage capacity of the off-line storage medium which is prepared by writing the data of the memory thereinto can be saved, namely, that the number of the off-line storage media can be reduced, to attain an economical advantage, and that when the embroidering system is used, the selection of the off-line storage media by an operator is facilitated, to enhance a manipulation efficiency.

Secondly, the storage medium is provided with flag storing parts for discriminating whether coordinate values are of a 1-byte system or of a 2-byte system, and small-sized patterns such as letters are stored by the 1-byte system, while large-sized patterns are stored by the 2-byte system. Therefore, the invention has the effect that, for the small-sized patterns which are stored by the 1-byte system, a storage capacity equal to about ½ of a capacity in the case of storing all embroidery data by means of the 2-byte system suffices.

Besides, in the embroidering device, whether the coordinate values are processed by the 1-byte system or the 2-byte system is discriminated according to the values of the flags in the load of the embroidery data. This produces the effect that the storage capacity can be effectively utilized.

Thirdly, the embroidery data is endowed with auxiliary dimension data in addition to frame information on the widths and heights of patterns in a prior art, so that the combinations of patterns having hitherto been impossible are permitted and that the moving limits of a frame before an embroidering operation are found precisely for actual embroidery parts. Therefore, the invention has the effect that the range of application of embroidery can be expanded.

What is claimed is:

1. In an embroidering system having an embroidery data input device which generates embroidery data on the basis of an embroidery pattern and stores the data in an off-line storage medium, and an embroidering device which moves a stitch forming mechanism and an embroidery frame relative to each other on the basis of the embroidery data of the storage medium, to form stitches and execute embroidery, an improvement comprising a control apparatus for the embroidering system wherein said embroidery data is made up of a flag which designates either a pattern whose coordinate values can be expressed within 254 units or a pattern whose coordinate values require at least 256 units, pattern data which indicate a contour of each block of said embroidery pattern divided into blocks, and which include coordinate values of each point stored in 1 byte or 2 bytes in correspondence with said flag, and a function code expressive of a form of the block connecting the coordinate values and being stored each time the block form changes, and dimension data which define said pattern, and when loading said pattern data, a controller of said embroidering device loads 2 bytes which determine whether or not said function code is included, whereby in case when said function code is included, a number of subsequent values to be loaded is determined in accordance with said function code, said coordinate values being loaded so as to execute a needle dropping calculation, and in case when said function code is not included, the same function as the preceding one is set, whereupon a number of coordinate values to be loaded is determined as the same number as the preceding one, including coordindate values of a common point at a rear end of the preceding block, the coordinate values being loaded so as to execute a needle dropping calculation.

2. A control apparatus for the embroidering system as defined in claim 1, wherein said controller of said embroidering device loads said coordinate values by means of a 1-byte system or a 2-byte system in accordance with a value of said flag stored in said off-line storage medium.

3. In an embroidering system having an embroidery data input device which generates embroidery data on the basis of an embroidery pattern and stores the data in an off-line storage medium and an embroidering device which moves a stitch forming mechanism and an embroidery frame relative to each other on the basis of the embroidery data of the storage medium, to form stitches and execute embroidery an improvement characterized in that said embroidery data is made up of a flag which designates either a pattern whose coordinate values can be expressed within 254 units or a pattern whose coordinate values require at least 256 units, pattern data which indicate a contour of each block of said embroidery pattern divided into blocks, and which include coordinate values of each point stored in 1 byte or 2 bytes in correspondence with said flag, and a function code expressive of a form of the block connecting the coordinate values and being stored each time the block form changes, and dimension data which define said pattern, and said dimension data comprising basic-frame dimension data which include H-dimension data corresponding to a sort of a letter or the like and expressing a Y-directional dimension set on a reference line, and W-dimension data set on aid reference line and expressing an X-directional dimension from a stitching start point to a stitching end point as is characteristic of the individual letter, and auxiliary dimension data which include FW dimension data expressing an X-directional dimension of a part of said embroidery data protrusive leftwards from said stitching start point, BW dimension data expressing an X-directional dimension of a part protrusive rightwards from said stitching end point, VH dimension data expressing a Y-directional dimension of a part protrusive above said stitching start point, and DH dimension data expressing a Y-directional dimension of a part protrusive below said stitching start point.

* * * * *